United States Patent
Knoll et al.

(10) Patent No.: US 10,072,140 B2
(45) Date of Patent: Sep. 11, 2018

(54) BLENDS OF THERMOPLASTIC ELASTOMERS BASED ON STYRENE (S-TPE) AND POLYOLEFINS

(71) Applicant: INEOS STYROLUTION GROUP GMBH, Frankfurt (DE)

(72) Inventors: Konrad Knoll, Mannheim (DE); Andrea Colombo, Heidelberg (DE)

(73) Assignee: INEOS STYROLUTION GROUP GMBH (DE)

( * ) Notice: Subject to any disclaimer, the term of this patent is extended or adjusted under 35 U.S.C. 154(b) by 36 days.

(21) Appl. No.: 15/117,386

(22) PCT Filed: Feb. 10, 2015

(86) PCT No.: PCT/EP2015/052692
§ 371 (c)(1),
(2) Date: Aug. 8, 2016

(87) PCT Pub. No.: WO2015/121216
PCT Pub. Date: Aug. 20, 2015

(65) Prior Publication Data
US 2016/0355673 A1    Dec. 8, 2016

(30) Foreign Application Priority Data

Feb. 11, 2014 (EP) .................... 14154638

(51) Int. Cl.
| | |
|---|---|
| *C08L 53/02* | (2006.01) |
| *C08L 23/12* | (2006.01) |
| *C08L 23/06* | (2006.01) |
| *B32B 27/32* | (2006.01) |
| *C08J 5/18* | (2006.01) |
| *B32B 7/02* | (2006.01) |
| *B32B 27/08* | (2006.01) |
| *B32B 27/30* | (2006.01) |
| *C08L 23/08* | (2006.01) |

(52) U.S. Cl.
CPC ............... *C08L 23/12* (2013.01); *B32B 7/02* (2013.01); *B32B 27/08* (2013.01); *B32B 27/302* (2013.01); *B32B 27/32* (2013.01); *C08J 5/18* (2013.01); *C08L 23/06* (2013.01); *C08L 23/0815* (2013.01); *B32B 2270/00* (2013.01); *B32B 2274/00* (2013.01); *B32B 2307/51* (2013.01); *B32B 2307/712* (2013.01); *B32B 2307/7244* (2013.01); *B32B 2307/7246* (2013.01); *B32B 2553/00* (2013.01); *C08J 2323/06* (2013.01); *C08J 2323/08* (2013.01); *C08J 2323/12* (2013.01); *C08J 2353/02* (2013.01); *C08J 2423/08* (2013.01); *C08J 2453/02* (2013.01); *C08L 2201/10* (2013.01); *C08L 2203/16* (2013.01); *C08L 2205/02* (2013.01); *C08L 2205/025* (2013.01); *C08L 2205/03* (2013.01); *C08L 2205/035* (2013.01); *C08L 2207/066* (2013.01); *C08L 2310/00* (2013.01)

(58) Field of Classification Search
CPC .... C08F 212/145; C08F 220/06; C08F 12/22; C08F 212/14; C08L 23/14; C08L 23/08; C08L 23/0807; C08L 23/0815; C08L 53/02; C08L 53/035; C08L 2205/025; C08L 2205/035
See application file for complete search history.

(56) References Cited

U.S. PATENT DOCUMENTS

| | | |
|---|---|---|
| 4,479,989 A | 10/1984 | Mahal |
| 5,972,519 A | 10/1999 | Niessner et al. |
| 6,031,053 A | 2/2000 | Knoll et al. |
| 6,197,889 B1 | 3/2001 | Knoll et al. |
| 6,323,285 B1 * | 11/2001 | Johnston ............... C08F 255/00 525/240 |
| 7,282,536 B2 | 10/2007 | Handlin, Jr. et al. |
| 2005/0282028 A1 | 12/2005 | Huber |
| 2005/0282965 A1 | 12/2005 | Huber |
| 2007/0240605 A1 * | 10/2007 | Iyer .......................... C08L 23/10 106/31.6 |
| 2008/0113138 A1 * | 5/2008 | Pecak ..................... C08L 23/06 428/36.9 |
| 2013/0048204 A1 * | 2/2013 | Chang ................. A61F 13/4902 156/244.11 |

FOREIGN PATENT DOCUMENTS

| | | |
|---|---|---|
| EP | 1607431 A1 | 5/2005 |
| EP | 1607432 A1 | 5/2005 |
| WO | 95/35335 A1 | 12/1995 |
| WO | 96/23823 A1 | 8/1996 |
| WO | 97/40079 A1 | 10/1997 |
| WO | 98/34783 A1 | 8/1998 |
| WO | 2012/055919 A1 | 5/2012 |

OTHER PUBLICATIONS

Niessner et al., electronic translation of WO 9623823 (Aug. 8, 1996).*

* cited by examiner

*Primary Examiner* — Jeffrey C Mullis
(74) *Attorney, Agent, or Firm* — J.A. Lindeman & Co., PLLC

(57) ABSTRACT

Polymer blend comprising components A, B and C: A: 1 to 19.5% by weight of an elastomeric block copolymer A based on styrene (S-TPE); B: 0.5 to 8% by weight of a compatibilizer component B; and C: 80 to 98.5% by weight of at least one semi-crystalline olefin homo- or copolymer C. The invention further relates to a composition comprising thermoplastic elastomers based on styrene (S-TPE) for use as compatibilizer of S-TPE block copolymers and polyolefins, a process for the preparation of the polymer blend, a master batch for the preparation of the polymer blend, and single- and multilayer films comprising said polymer blend and their use for food packaging and as shrink hood.

18 Claims, No Drawings

BLENDS OF THERMOPLASTIC ELASTOMERS BASED ON STYRENE (S-TPE) AND POLYOLEFINS

The invention relates to a polymer blend comprising thermoplastic elastomers based on styrene (S-TPE) and polyolefins. The invention further relates to a composition comprising thermoplastic elastomers based on styrene (S-TPE) for use as compatibilizer of S-TPE block copolymers and polyolefins, a process for the preparation of the polymer blend, a master batch for the preparation of the polymer blend, and single- and multilayer films comprising said polymer blend and their use.

Packaging films are often produced from polyolefins, in particular polyethylene and/or polypropylene films. However, deficits regarding impact properties and other properties are observed.

In order to permit production of thinner films, it is desirable to increase the crack propagation resistance, puncture resistance and dart impact properties of the polyolefin film.

U.S. Pat. No. 5,972,519, WO 96/23823 and WO 98/34783 describe flexible, transparent films comprising styrene-butadiene block copolymers P1 for food packaging. P1 is a S-TPE block copolymer comprising hard blocks (S) and soft blocks (B/S) having random styrene/butadiene distribution. The block copolymers can have a star shaped or linear structure S-(S/B)-S. The films can additionally comprise thermoplastic polymers P2, inter alia homo- and copolymers of olefins. Said polyolefins can additionally contain minor amounts of ethylene-octene copolymers or ethylene-hexene copolymers with a high content of octene or hexene (e.g. commercial products Affinity® or Engage® of the Dow Chemical Company, USA). No example of a film comprising a blend of P1 and an olefin homo- or copolymer P2 is shown.

EP-A 1607432 and EP-A 1607431 disclose polymer films comprising a thermoplastic elastomer based on styrene (S-TPE) and a polyolefin. As S-TPE preferably linear styrene-butadiene block copolymers of the general structure S-(S/B)-S are used having, between the two S blocks, one or more (S/B) random blocks having random styrene/butadiene distribution. Said polymer films often have unpredictable and fluctuating film properties due to melt demixing during processing.

Thus, one problem to be solved is to achieve sufficient, reproducible dispersion of an S-TPE in a polyolefin film to gain constantly good results.

It is one object of the present invention to provide improved polymer blends comprising S-TPE and polyolefins, in particular films, which have a low polymer "fish-eye level", and which even when film thicknesses are low, have adequate puncture resistance, good crack propagation resistance and dart impact properties. It was found that this object is achieved by means of a specific type of compatibilizer comprised in the polymer blend according to the invention.

The invention provides a polymer blend comprising components A, B and C:

A: 1 to 19.5% by weight of an elastomeric block copolymer A made from at least one block S which forms a hard phase and incorporates units of a vinylaromatic monomer, and at least one elastomeric block B/S which forms a soft phase and incorporates both units of a vinylaromatic monomer (S) and of a diene (B), where S is the vinylaromatic block and B/S is the soft phase, wherein the block is built up randomly from diene units and vinylaromatic units, and where the glass transition temperature Tg of the block S is above 25° C., and that of the block B/S is below 25° C., and the phase volume ratio of block S to block B/S is selected so that the proportion of hard phase in the entire block copolymer is from 1 to 40% by volume and the proportion of the diene is less than 50% by weight, based on A;

B: 0.5 to 8% by weight of component B
comprising components B1 and further optional components B2 and/or B3:
  B1: at least one elastomeric block copolymer selected from the group consisting of B11, B12 and B13:
    B11: block copolymer B11 made from at least one block S which forms a hard phase and incorporates units of a vinylaromatic monomer, and at least one elastomeric block EB which forms a soft phase and incorporates units of ethylene and butylene; and/or
    B12: block copolymer B12 made from at least one block S which forms a hard phase and incorporates units of a vinylaromatic monomer, and at least one elastomeric block EP which forms a soft phase and incorporates units of ethylene and propylene; and/or
    B13: block copolymer B13 made from at least one block S which forms a hard phase and incorporates units of a vinylaromatic monomer, and at least one elastomeric block B which forms a soft phase and incorporates units of a diene (B), and the proportion of the hard phase in the entire block copolymer is at most 45% by weight, based on B13;
  B2: a stiff/tough block copolymer B2 made from at least one block S which forms a hard phase and incorporates units of a vinylaromatic monomer, and at least one elastomeric block B which forms a soft phase and incorporates units of a diene (B), and the proportion of the hard phase in the entire block copolymer is more than 50% by weight, based on B2;
  B3: an ethylene-$(C_3$-$C_{18})$-$\alpha$-olefin copolymer B3 with a high content of $(C_3$-$C_{18})$-$\alpha$-olefin, based on B3, and having a crystallinity of less than 50%;

C: 80 to 98.5% by weight of at least one semi-crystalline olefin homo- or copolymer C different from component B3;

where the entire weight of components A, B and C gives exactly 100% by weight.

The polymer blend comprises preferably from 1 to 15%, more preferably 2 to 12% by weight of component A; preferably from 0.8 to 6%, more preferably 1.0 to 4.5 by weight of component B; and preferably 84.2 to 98.2%, more preferably 87 to 97% by weight of component C.

According to a further embodiment, the polymer blend comprises preferably from 10 to 17%, more preferably 12 to 16% by weight of component A; preferably from 0.8 to 6.0%, more preferably 1.0 to 6.0 by weight of component B; and preferably 80 to 87%, more preferably 80 to 85% by weight of component C.

In particular preferred are polymer blends in which the afore-mentioned amounts of components A and B together are no more than 20%, preferably 2 to 12% by weight and where the entire components A, B and C give exactly 100% by weight.

In the Context of the Invention the Term "Diene" Refers to a 1,3-Diene, in Particular 1,3-Butadiene and/or Isoprene, Often Butadien.

Component A

An elastomeric block copolymer A according to the invention is obtained by forming the soft phase within the definition of the above parameters from a random copolymer of a vinylaromatic compound with a diene; random copolymers of vinylaromatic compounds and dienes are obtained by polymerization in the presence of a polar cosolvent. Further, more detailed information on the preparation of elastomeric block copolymers consisting of or comprising a random copolymer of a vinylaromatic compound and a diene is given in WO 95/35335.

According to the present invention the random copolymer block B/S of the block copolymer A also comprise the diene/vinylaromat soft block described in U.S. Pat. No. 7,282,536 (col. 6, l. 36 to col. 8, l. 2 and FIGS. 1 to 3) with controlled diene/vinylaromat composition change along the polymer chain. Preferred is a softblock with a gradient, where the diene content increases from the block center towards the ends of the block, which are attached to a vinylaromat block (col. 8, l. 3 to 15).

A block copolymer A according to the invention can be represented, for example, by one of the formulae 1 to 12:

S-B/S-S; (1)

(S-B/S)n; (2)

(S-B/S)n-S; (3)

B/S-(S-B/S)n; (4)

X-[(S-B/S)n]m+1; (5)

X-[(B/S-S)n]m+1; (6)

X-[(S-B/S)n-S]m+1; (7)

X-[(B/S-S)n-B/S]m+1; (8)

Y-[(S-B/S)n]m+1; (9)

Y-[(B/S-S)n]m+1; (10)

Y-[(S-B/S)n-S]m+1; (11)

Y-[(B/S-S)n-B/S]m+1; (12)

where S is the vinylaromatic block and B/S is the soft phase, ie. the block built up randomly from diene units and vinylaromatic units, X is the radical of an n-functional initiator, Y is the radical of an m-functional coupling agent and m and n are natural numbers from 1 to 10.

A preferred block copolymer is one of the general formulae S-(B/S)-S, X-[-(B/S)-S]$_2$ and Y-[-(B/S)-S]$_2$ (for the meanings of abbreviations, see above) and a particularly preferred block copolymer is a linear block copolymer of the structure S-(B/S)-S.

The vinylaromatic monomer is preferably chosen from styrene, α-methylstyrene, vinyltoluene and 1,1-diphenylethylene, and the diene from butadiene and isoprene.

A particularly preferred combination of monomers is butadiene and styrene. All weights and volumes stated below are based on this combination; when technical equivalents of styrene and butadiene are used, the data will have to be correspondingly converted. The B/S block is preferably composed of about 75-30% by weight of styrene and 25-70% by weight of butadiene. A flexible block particularly preferably has a butadiene content of from 35 to 70% and a styrene content of from 65 to 30%.

In the case of the monomer combination styrene/butadiene, the amount of the diene in the total block copolymer is preferably 15-65% by weight and that of the vinylaromatic component is correspondingly 85-35% by weight. Butadiene/styrene block copolymers having a monomer composition comprising 25-60% by weight of diene and 75-40% by weight of vinylaromatic compound are particularly preferred.

Particular preference is given to linear styrene-butadiene block copolymers of the general structure S-(S/B)-S having, situated between the two S blocks, one or more (S/B)-random blocks having random styrene/butadiene distribution. These block copolymers are obtainable via anionic polymerization in a non-polar solvent with addition of a polar cosolvent or of a potassium salt, as described by way of example in WO 95/35335 or WO 97/40079.

Vinyl content is the relative proportion of 1,2-linkages of the diene units, based on the entirety of 1,2-, 1,4-cis and 1,4-trans linkages. The 1,2-vinyl content in the styrene-butadiene copolymer block (S/B) is preferably below 20%, in particular in the range from 9 to 15%, particularly preferably in the range from 9 to 12%. Suitable block copolymers A having such a 1,2-vinyl content in the styrene-butadiene copolymer block (S/B) are described in detail in WO 97/40079.

Very particular preferred block copolymers A according to the present invention are linear styrene-butadiene block copolymers of the general structure S-(SIB)-S having, situated between the two S blocks, one or more (S/B)-random blocks having random styrene/butadiene distribution, and a 1,2-vinyl content in the styrene-butadiene copolymer block (S/B) of below 20%. The afore-mentioned linear styrene-butadiene block copolymers are commercially available as Styroflex®2G 66 from Styrolution, Germany.

Further preferred block copolymers A have a star-shaped molecular architecture, where the star-shaped molecular architecture has at least two different arms of the star, having the structure one of the following general formulae:

Y[(B/S-S)$_n$]$_m$[S]$_l$

Y[(S-B/S)$_n$-S]$_m$[S]$_l$ where S B/S n and m have the meaning given above Y is the moiety of an (m+l)-functional coupling agent, and l is a natural number from 1 to 10. Said star shaped block copolymers A are described in detail in WO 2012/055919.

Component B

Component B comprises component B1 and further optional components B2 and/or B3. Thus, component B can comprise component B1 alone or a combination of B1 with B2 and/or B3 such as: B1 and B2; B1 and B3; and B1, B2 and B3.

Component B1 alone is in particular preferred. Furthermore, preferred are the afore-mentioned combinations of component B1.

The amount of component B1, based on the entire component B, is generally 1 to 100% and preferably 10 to 100%. Furthermore in the interest of cost reduction a reduced amount of component B1, based on the entire component B, of preferably from 15 to 50%, more preferably 25 to 40% by weight is also preferred and effective.

The amount of component B2, based on the entire component B, is generally 0 to 99%, preferably 0 to 90, more preferably 20 to 70%, most preferably 30 to 60% by weight. If component B2 is present its minimum amount comprised is usually 0.1% by weight.

The amount of component B3, based on the entire component B, is generally 0 to 99%, preferably 0 to 90%, more preferably 10 to 50%, most preferably 15 to 45% by weight. If component B3 is present, its minimum amount comprised is usually 0.1% by weight.

The amounts of components B1, B2 and B3 together give exactly 100% by weight, based on component B.

Component B1

According to the invention component B1 can comprise component B11, B12 or B13, each of which alone or in combination with each other. Suitable combinations are: B11 and B12; B11 and B13; B12 and B13; B11, B12 and B13.

The amounts of components B11, B12 and B13 together give exactly 100% by weight, based on component B1.

Component B11

Elastomeric SEBS (Styrene-Ethylene/Butylene-Styrene) block copolymer B11 having at least one elastomeric block EB which forms a soft phase and incorporates units of ethylene and butylene is obtainable by hydrogenation of a SBS (Styrene-Butadiene-Styrene) block copolymer comprising a butadiene soft block and styrene hard blocks. The ethylene-butylene soft phase originates from the center butadiene block with approximately 40-50% by weight 1,2-vinyl content.

The amount of the vinylaromatic component is preferably 20-40% by weight in the total block copolymer and that of ethylene and butylene is correspondingly 60 to 80% by weight.

Suitable SEBS block copolymers B11 are commercially available as Kraton® G from Kraton Performance Polymers Inc., USA, and as high-performance rubber Septon® from Kuraray, USA.

The amount of component B11, based on the entire component B1, is 0 to 100%, preferably 25 to 100%, more preferably 40 to 100% by weight. Furthermore, the amount of component B11, based on the entire component B1, is 0 to 100%, preferably 25 to 75%, in particular 40 to 60% by weight.

If component B11 is present its minimum amount comprised is usually 0.1% by weight.

Component B12

Elastomeric block copolymer B12 having at least one elastomeric block EP which forms a soft phase and incorporates units of ethylene and propylene is an SEPS (Styrene Ethylene Propylene Styrene) or SEEPS block copolymer which s obtainable by hydrogenation of a (styrene-b-isoprene-b-styrene) block copolymer comprising an isoprene soft block and styrene hard blocks or of a block copolymer of the type poly(styrene-b-isoprene/butadiene-b-styrene) which soft phase is made from an isoprene/butadiene-copolymer.

Suitable SEPS and SEEPS blockcopolymers B12 are commercially available as Septon® from Kuraray.

The amount of component B12, based on the entire component B1, 0 to 100%, preferably 25 to 100%, more preferably 40 to 100% by weight. Furthermore the amount of component B12, based on the entire component B1, is 0 to 100%, preferably 25 to 75%, in particular 40 to 60% by weight.

If component B12 is present its minimum amount comprised is usually 0.1% by weight.

Component B13

Elastomeric block copolymers B13 are made from at least one block S which forms a hard phase and incorporates units of a vinylaromatic monomer, and at least one elastomeric block B which forms a soft phase and incorporates units of a diene (B), and the proportion of the hard phase in the entire block copolymer is at most 45% by weight, based on B13.

Preferred as component B13 are SBS (Styrene Butadiene Styrene) block copolymers wherein the diene is butadiene and the vinylaromatic monomer is styrene.

Suitable SBS block copolymers B13 are commercially available as Kraton® D from Kraton Performance Polymers Inc. and as Asaprene® from Asahi.

Also preferred as component B13 are SIS block copolymers (Styrene Isoprene Styrene) commercially available as Kraton® D from Kraton Performance Polymers Inc.

The amount of component B13, based on the entire component B1, is 0 to 100%, preferably 0 to 50%, more preferably 0 to 20% by weight. If component B13 is present its minimum amount comprised is usually 0.1% by weight.

Component B2

Stiff/tough block copolymers B2 are made from at least one block S which forms a hard phase and incorporates units of a vinylaromatic monomer, and at least one elastomeric block B which forms a soft phase and incorporates units of a diene (B), and the proportion of the hard phase in the entire block copolymer is more than 50% by weight, based on B2.

Preferred as component B2 are SBS (Styrene Butadiene Styrene) block copolymers wherein the diene is butadiene and the vinylaromatic monomer is styrene.

Suitable SBS block copolymers B2 are commercially available as Styroclear® GH 62, Styrolux® 3G33 and Styrolux® 693 D from Styrolution; K-Resin® from Chevron Phillips Chemical; Asaflex® from Asahi Kasei, Clearen® from Denka (DENKI KAGAKU KOUGYO KABUSHIKI KAISYA).

Component B3

Copolymers suitable as component B3 have a crystallinity of less than 50%, preferably of less than 45%, and have a high content, preferably 10 to 30% by weight, more preferably 20 to 25%, most preferred 25% by weight, of the $(C_3-C_{18})$-α-olefin comonomer. Component B3 is preferably at least one ethylene-$(C_3-C_{12})$-α-olefin copolymer, more preferably an ethylene-$(C_3-C_3)$-α-olefin copolymer, such as copolymers of ethylene with comonomers such as propylene, 1-butene, 1-pentene, 1-hexene, 1-heptene, 1-octene, 1-nonene, 1-decene, 1-undecene and 1-dodecene.

In particular preferred are ethylene-hexene copolymers and most preferred ethylene-octene copolymers, which are commercially available as Affinity® or Engage® from DOW Chemical Co. Most preferred is Engage®.

Component C

Examples of suitable olefin homo- or copolymers C are semicrystalline polyolefins, such as homo- or copolymers of ethylene, propylene, 1-butene, 1-pentene, 1-hexene, 1-heptene, 3-methyl-1-butene, 4-methyl-1-butene, 4-methyl-1-pentene and 1-octene. Homo- or copolymers C are preferably made from ethylene, propylene, 1-butene, 4-methyl-1-pentene.

The olefin homo- or copolymers C can be used alone or as their mixtures.

Olefin homo- or copolymers C are more preferably a high-density polyethylene (HDPE), a low-density polyethylene (LDPE), a linear low-density polyethylene (LLDPE) or a propylene homo- or copolymer (PP), preferably with an ethylene comonomer. In particular preferable are LDPE, LLDPE or PP.

According to a first embodiment of the invention polymer blends comprising components A, B1 and C are in particular preferred.

According to a second embodiment of the invention polymer blends comprising components A, B1, B2 and C are preferred.

According to a third embodiment of the invention polymer blends comprising components A, B1, B3 and C are preferred.

According to a fourth embodiment of the invention polymer blends comprising components A, B1, B2, B3 and C are preferred.

In said embodiments the components are used in the afore-mentioned amounts.

More preferable are inventive polymer blends of said afore-mentioned embodiments wherein component B1 is B11 and/or B12, in particular B11.

Furthermore preferable are inventive polymer blends of said afore-mentioned embodiments wherein A is a linear styrene-butadiene block copolymer of the general structure S-(S/B)-S.

Particular preferred are inventive polymer blends comprising components A, B11, B2, B3 and C.

Furthermore particular preferred are inventive polymer blends comprising components A, B12, B2, B3 and C.

Furthermore particular preferred are inventive polymer blends comprising components A, B11, B12, B2, B3 and C.

Most preferred are inventive polymer blends comprising components A, B11 and C; A, B12 and C; and A, B11, B12 and C.

In particular preferred are blends of the following composition:
1 to 10% by weight of component A,
0.8 to 2.5% by weight of component B11 and/or B12, in particular B11, and
87.5 to 98.2% by weight of component C,
where A, B11, B12 and C give exactly 100% by weight.

Furthermore preferred are blends of the following composition:
10 to 17% by weight of component A,
1.0 to 6.0% by weight of component B11 and/or B12, in particular B11, and
80 to 87% by weight of component C,
where A, B11, B12 and C give exactly 100% by weight.

Furthermore preferred are blends of the following composition:
1 to 10% by weight of component A,
0.1 to 0.8% by weight of component B11 and/or B12, in particular B11,
0.1 to 0.8% by weight of component B2,
0.1 to 0.8% by weight of component B3, and
87.6 to 98.7% by weight of component C,
where A, B11, B12, B2, B3 and C give exactly 100% by weight.

Furthermore more preferred are blends of the following composition:
1 to 10% by weight of component A,
0.2 to 0.8% by weight of component B11 and/or B12, in particular B11,
0.2 to 1.0% by weight of component B2,
0.1 to 0.8% by weight of component B3, and
87.4 to 98.5% by weight of component C,
where A, B11, B12, B2, B3 and C give exactly 100% by weight.

Furthermore preferred are blends of the following composition:
1 to 10% by weight of component A,
0.8 to 2.5% by weight of component B11 and/or B12, in particular B11,
0.8 to 2.5% by weight of component B2,
85 to 94% by weight of component C,
where A, B11, B12, B2 and C give exactly 100% by weight.

Furthermore preferred are blends of the following composition:
10 to 17% by weight of component A,
0.8 to 3.0% by weight of component B11 and/or B12, in particular B11,
0.8 to 3.0% by weight of component B2,
80 to 87% by weight of component C,
where A, B11, B12, B2 and C give exactly 100% by weight.

Furthermore preferred are blends of the following composition:
1 to 10% by weight of component A,
0.8 to 2.5% by weight of component B11 and/or B12, in particular B11,
0.8 to 2.5% by weight of component B3,
85 to 94% by weight of component C,
where A, B11, B12, B3 and C give exactly 100% by weight.

Furthermore preferred are blends of the following composition:
10 to 17% by weight of component A,
0.8 to 3.0% by weight of component B11 and/or B12, in particular B11,
0.8 to 3.0% by weight of component B3,
80 to 87% by weight of component C,
where A, B11, B12, B2 and C give exactly 100% by weight.

Furthermore preferable are inventive polymer blends of said afore-mentioned embodiments and compositions wherein A is a linear styrene-butadiene block copolymer of the general structure S-(S/B)-S; B1 is B11 and/or B12, in particular B11; C is polyethylene, in particular LDPE or LLDPE; or polypropylene, or their mixtures; and, if present, B3 is an ethylene-octene copolymer, and B2, if present, is a SBS block copolymer.

The inventive polymer blend may also comprise the usual auxiliaries and additives as component D, such as lubricants, antiblocking agents, antifogging agents, release agents, stabilizers, antioxidants, UV-absorbers, antistatic agents, flame retardants, colorants, etc.

The additional use of UV-absorbers is preferred, in particular by use of the polymer blend as a weather resistant film.

The auxiliaries and additives D can be present in the inventive polymer blend in a proportion of from 0 to 50% by weight, preferably from 0 to 45% by weight, more preferably 0 to 30% by weight, and particularly preferably from 0 to 10% by weight, based on the entire polymer blend. If component D is present its minimum amount comprised is usually 0.1% by weight.

A further subject of the invention is at least one compatibilizer comprising or consisting of the afore-mentioned component B comprising or consisting of components B1 and further optional components B2 and/or B3, which is in particular suitable as compatibilizer for blends comprising S-TPE of the type of component A and polyolefins C.

Thus, a further subject of the invention is the use of said compatibilizer as compatibilizer for blends comprising S-TPE of the type of component A and polyolefins C.

Suitable inventive compatibilizers B are selected from the group comprising the following components or combination of components: B1; B1 and B2; B1, B2 and B3; and B1 and B3.

Among said afore-mentioned compatibilizers B such wherein B1 is B11 and/or B12, in particular B11, are preferred.

More preferred are inventive compatibilizers B comprising or consisting of: B11 and B2; B11 and B3; and/or B11, B2 and B3.

In said compatibilizers B2, if present, is preferably a SBS block copolymer, and B3, if present, is an ethylene-octene copolymer.

In particular preferred are inventive compatibilizers B comprising or consisting of: B11, B2 and B3.

The composition of the compatibilizer B in respect to the amounts of components B1, and, if present, components B2 and/or B3, is as herein before described for component B.

Preferably compatiblizer B comprises:
15 to 50%, more preferably 25 to 40% by weight of component B1
20 to 70%, most preferably 30 to 60% by weight of component B2 and
10 to 50%, most preferably 15 to 45% by weight of component B3,
where the entire components B1, B2 and B3 together give exactly 100% by weight.

More preferably compatiblizer B comprises:
25 to 40% by weight of component B1
30 to 60% by weight of component B2 and
15 to 45% by weight of component B3,
where the entire components B1, B2 and B3 together give exactly 100% by weight.

The polymer blends according to the invention can generally be obtained by any usual method, eg. by joint extrusion and calendering.

The calendering is expediently carried out firstly in kneaders or extruders (softening) and, if desired, on mixing rolls, followed by the actual calendering process with, if desired, addition of suitable stabilizers. Blowmolding and injection molding are carried out on the usual machinery.

The extrusion can be carried out on single- or twin-screw extruders. However, sometimes mixing and homogeneity problems of the components used for the inventive polymer blend occur under the usual extrusion temperature conditions (200 to 210° C.) due to the high viscosity of component B1 particularly in case of single-screw extruders with limited mixing capability. Preferred are twin-screw extruders particular equipped with screws containing kneading elements beside transport elements. Therefore, in case of direct feeding of the components of the inventive polymer blend advantageously a twin screw extruder is used for the extrusion and the temperature of the middle zones of the twin screw extruder (e.g. FTS 16) is preferably set to 230 to 260° C., in particular to 250° C.

It has been a further object of the invention to provide an improved process for the preparation of the polymer blend according to the invention.

According to the inventive process for the preparation of the inventive polymer blend, in a first step pre-compounds of components A and B1 and, if present, components B2 and B3 are prepared and pelletized in an extruder. In a second step said pre-compound is pre-mixed with polyolefin pellets of component C and then this mixture is extruded, preferably by cast film extrusion, to give the inventive polymer blend, preferably as cast film. Said inventive process can be carried out on single- or twin-screw extruders, under usual extrusion temperature conditions.

For the inventive process preferably a twin screw extruder is used. Advantageously a FTS 16 twin screw extruder having an L/D ratio of 40 with eight 5D shots and ten zones can be used.

For pre-compounding the feeding zone of the single- or twin-screw extruder is preferably set to a temperature in the range of 130 to 150° C., the mixing/kneading zones to 180 to 200° C. and the final zones to 200 to 220° C.

For workup the extruder can be equipped with a hole-plate, water-bath and pelletizer for making pellets, preferably micro-pellets.

For making cast films the same extruder can be used by mounting a slit die of a suitable slit width (e.g. 0.2 to 0.5 mm) and the temperatures are preferably set as mentioned for the extrusion before, the chill roll is preferably kept at 30 to 50° C.

A further subject of the invention is a masterbatch for the preparation of the inventive polymer blend. The masterbatch is preferably prepared by twin screw extrusion as herein before mentioned.

According to a first embodiment the masterbatch comprises a pre-compound of components A and B1 and, if present, components B2 and B3, which can be used as such for mixing with component C, or alternatively to said masterbatch and component C further amounts of component A can be added, provided that the total amount of component A, comprised in the inventive blend, is as defined herein before.

An inventive master batch comprising components A, B1, B2 and B3 is preferred.

Preferably said inventive master batch comprises 50 to 60% by weight of component A, 10 to 20% by weight of component B1, 5 to 15% by weight of component B2 and 15 to 30% by weight of component B3, where the entire components A, B1, B2 and B3 give exactly 100% by weight.

More preferred is a master batch of said composition, wherein A is a linear S-(S/B)-S block copolymer; B1 is B11 and or B12, in particular B11, B2 is an SBS-block copolymer and B3 is an ethylene-octene copolymer.

According to a second embodiment the masterbatch comprises a pre-compound of components C and B1 and, if present, components B2 and B3, which can be used as such for mixing with component A, or, alternatively, to said masterbatch and component A further amounts of component C can be added, provided that the total amount of component C, comprised in the inventive blend, is as defined herein before.

Said inventive master batch comprises preferably 30 to 70%, more preferably 40 to 60% by weight of component C, and correspondingly preferably 70 to 30%, more preferably 60 to 40% by weight of component B.

In said masterbatch the entire components C and B give exactly 100% by weight.

The polymer blends according to the invention are useful in producing films of all types, such as cast-film, chill-roll, coextruded, blown- and extruded films or calendered films.

Thin films can be produced by cast-film, blown-film, chill-roll or other usual processes. Thin films in the range from 5 to 200 μm can be obtained which are in some cases very tough and have high resilience.

Blends according to the invention can be used to make single layer films e.g. by blow molding or sheet extrusion using a slit die. By controlling the speed of the chill roll the film can be further stretched and thinned. E.g. starting with a 200 μm film after the silt die one can easily obtain films with preferred 10 to 100 μm, more preferred 20 to 50 μm by adjusting the chill roll speed.

Blends according to the invention are also preferred part of a bi- or multilayer film produced as described for single-layer films. In a bilayer film with the layers L and M, layer L comprises or consists of a blend according to the invention with a total component A and B content of preferred 5 to 50%, layer M can comprise or consist predominantly or essentially of component C. The relative thickness of the layers can vary preferentially between 10 and 90%. Layer M can further comprise or consist predominantly or essentially of component A. In a tri-layer film with the layers L, M and N one or two of the layers can be a blend according to the invention, the other or others respectively may comprise or consist predominantly or essentially of component C and/or predominantly or essentially of component A. One or two layers can also be a blend of components C and B3.

In a preferred embodiment layer L comprises or consists predominantly or essentially of component C, layer M comprises or consists of component B3 or a blend of the components C and B3, and layer N comprises or consists of a blend according to the invention. The relative layer thickness varies preferentially between 5 and 90%. One particularly preferred embodiment is a relative thickness of layer L of 40 to 75%, of layer M of 10 to 20% and of layer N of 10 to 40%.

In another preferred embodiment layers L and N comprise or consist predominantly or essentially of component C and layer M comprises or consists of a blend according to the invention. The relative layer thickness varies preferentially between 5 and 90%. One particularly preferred embodiment is a relative thickness of layers L and N of 5 to 25% and of layer M of 50 to 90%. In a particularly preferred embodiment layers L and N contain UV-absorbers as additional additives.

Preferred are further films with four, five and more layers with one or more layers comprising or consisting of blends according to the invention. In a layer sequence L, M, N, O and P as preferential embodiment layers L and P comprise or consist of a blend according to the invention, layers M and O of component B3 or a blend of components C and B3 and layer N predominantly or essentially of component A.

In another preferred embodiment layer N comprises or consists of a polyamide, particularly preferred of polyamide 6, layers M and O comprise or consist predominantly or essentially of component A and layers L and N of blends according to the invention.

The inventive polymer blends and films produced therefrom have an improved crack-propagation resistance, puncture resistance and dart impact properties.

A further subject of the invention is the use of films comprising the inventive polymer blend for food packaging or as barrier film for gases such as oxygen and water vapour or, in particular as weather resistant film, as shrink hood for packaging pallets.

Single layer-films comprising the inventive polymer are preferably used as thin food packaging films; multi-layer films are used as barrier films and as weather resistant strong elastic films for shrink hood applications e.g. for packaging pallets.

The following examples and claims further illustrate the present invention.

EXAMPLES

Starting Materials

Component A: Styroflex® 2G 66 from Styrolution (Frankfurt, Germany), a linear styrene-butadiene triblock copolymer of the structure S-(S/B)-S, the amount of the monomers in the total block copolymer is 35% by weight of butadiene and 65% by weight of styrene; the weight ratio of the blocks is 16/68/16; MFI: 14 (200° C./5 kg) g/10 min Component B11: Kraton® G 1650 from Kraton Performance Polymers Inc., a linear symmetrical SEBS block copolymer, the amount of ethylene/butylene in the total block copolymer is 70.8% by weight and that of styrene is 29.2% by weight, solution viscosity (20% in toluene, 25° C. (BMS 0380)): 1.0 bis 1.9 Pas Component B13-1: Kraton® D 1101 from Kraton Performance Polymers Inc., a linear symmetrical SBS block copolymer, the amount of butadiene in the total block copolymer is 68 bis 70% by weight and that of styrene is 30 bis 32% by weight, MFI: <1 (200° C./5 kg) g/10 min, solution viscosity (20% in toluene, 25° C. (BMS 0380)): 4

Component B13-2: Kraton® D 1102 from Kraton Performance Polymers Inc., a linear symmetrical SBS block copolymer, the amount of butadiene in the total block copolymer is 70 bis 73% by weight and that of styrene is 27 bis 30% by weight, MFI: 12 (200° C./5 kg) g/10 min Component B2: Styroclear® GH 62 from Styrolution, a star shaped SBS (Styrene Butadiene Styrene) block copolymer, the amount of butadiene in the total block copolymer is 26% by weight and that of styrene is 74% by weight, MFI: 15 (200° C./5 kg) g/10 min Component B3: Engage® 8480 from DOW Chemical Co., an ethylene-octene copolymer; density: 0.902 g/cm$^3$; shore A hardness: 89; MFI 1.0 (190° C./2.16 kg) g/10 min Component C-1: Lupolen® 2420, a low density polyethylene (LDPE); density: 0.923 g/cm$^3$, MFI 0.25 (190° C./2.16 kg) g/10 min of Lyondell Basell Industries Component C-2: Moplen HP500N, a polypropylene (PP) homopolymer; density: 0.90 g/cm$^3$, MFI: 12 (230° C./2.16 kg) g/10 min of Lyondell Basell Industries Test Methods The test specimens for the mechanical and optical tests were cut out longitudinally and transversely from the films.

Crack propagation resistance was determined according to DIN ISO 34-1:04-07 method B, process (b) with notch.

The puncture resistance test was carried out in accordance with the proposed standard FNK 403.3.

Tensile strength at break ($\sigma$-B) and tensile strain at break ($\varepsilon$-B) were determined in the ISO 527-2 tensile test.

The dart drop test was determined in accordance with DIN 53373.

Haze: ASTM D 1003-13

Transmission: ASTM D 1003-13

Yellowness Index (YI): determined according to ASTM E 313

Shore A hardness: DIN ISO 7619-1

MFI: ISO 1133

Density: ISO 1183-1

Preparation of Polymer Blends

Pre-compounds of component A with compatibilizers B have been made on a 16 mm twin-screw extruder (FTS16) and micro-pelletized. The composition of the pre-compound is shown in table 1. In a second step the obtained pre-compound has been pre-mixed with polyolefin micro-pellets in a weight ratio 20/80 and 0.5 mm cast films have been made on the same extruder using a slit die.

The FTS 16 twin screw extruder had an L/D ratio of 40 with eight 5D shots and ten zones. The screws (combination 26) were equipped with two kneading elements at zone 3 and 6. For pre-compounding the feeding zone 1 was kept at 140° C., the mixing/kneading zones 2 to 6 190° C. and the final zones 210° C. For workup the extruder was equipped with a hole-plate, water-bath and pelletizer for making micro-pellets. For making cast films a 0.5 mm slit die was mounted and the temperatures set to 150°/200°/210° C., the chill roll was kept at 40° C.

Crack propagation resistance parallel to extrusion (CPR //) and perpendicular to extrusion (CPR ⊥) and puncture resistance (PRW=puncture resistance work) of the inventive polymer blend has been tested as well as optics (transparency, haze, yellowness index YI).

Table 1 shows the composition of the pre-compounds in parts by weight.

The mechanical data are listed in table 1-a PP (polypropylene); the optical data are shown in table 1-b PP; in these tables the composition of the pre-compounds is shown in parts.

PP has an inventive blend comprising precompound A5 and A6 as shown by examples 16 and 17.

Further pre-compounds and inventive polymer blends comprising additionally component B3 have been prepared. The experiments have been performed under the same conditions as described before.

Tables 2-PE (polyetylene) and 2-PP (polypropylene) show the composition of the precompounds in parts. The weight ratio polyolefin/pre-compound was 80/20.

The mechanical data are listed in tables 2-a PP and 2-a PE; the optical data are shown in tables 2-b PP and 2-b PE.

TABLE 1

| | Precompounds | | | | |
|---|---|---|---|---|---|
| | B1 | | | | |
| Precompound | B13-1 | B13-2 | B11 | B2 | A |
| A1 | 100 | — | — | — | 400 |
| A2 | 50 | — | — | 50 | 400 |
| A3 | — | 100 | — | — | 400 |
| A4 | — | 50 | — | 50 | 400 |
| A5 | — | — | 100 | — | 400 |
| A6 | — | — | 50 | 50 | 400 |
| A8 | 33 | — | 33 | 33 | 400 |
| A9 | — | 33 | 33 | 33 | 400 |
| A10 | — | 50 | 50 | — | 400 |
| A11 | 50 | — | 50 | — | 400 | components in parts

TABLE 1-a

PP - Mechanical properties

| | Crack propagation resistance DIN ISO 34-1:04-07 Method B, Process (b) with cut | | | | Puncture Resistance | | |
| --- | --- | --- | --- | --- | --- | --- | --- |
| Example | CPR MD N/mm | Fmax Lm N | CPR TD N/mm | Fmax Lm N | Fmax N | W Break Nmm | Pre compound An |
| 12 | 248.7 | 113.93 | 60.8 | 28.1 | 51.49 | 254.7 | A1 |
| 13 | 275.2 | 125.15 | 58.1 | 26.72 | 56.06 | 269.1 | A2 |
| 14 | 259.1 | 118 | 57.1 | 25.96 | 53.34 | 230.1 | A3 |
| 15 | 274 | 126.14 | 56.4 | 26.1 | 55.08 | 230.8 | A4 |
| 16 | 270.6 | 131.99 | 75.9 | 37.83 | 61.14 | 319.6 | A5 |
| 17 | 210.8 | 101.89 | 73.4 | 37.04 | 63.16 | 330.1 | A6 |
| 19 | 246.4 | 118.55 | 67.9 | 33.7 | 60.51 | 318.5 | A8 |
| 20 | 256.3 | 125.31 | 69.6 | 35.23 | 60.44 | 297 | A9 |
| 21 | 252.3 | 123.28 | 72.3 | 36.02 | 61.23 | 321.3 | A10 |
| 22 | 275.2 | 136.24 | 71.7 | 35.6 | 61.51 | 323.8 | A11 |
| C1 | 89.4 | 44.67 | 30.7 | 15.61 | 35.25 | 142.2 | pure PP |

The examples are blends of 20% precompound A and 80% polypropylene C

TABLE 1-b

PP - optical Properties

| Example | Haze H % | Transmission Y % | Yellowness YI | Precompound An |
|---|---|---|---|---|
| 12 | 98.91 | 55.10 | 16.23 | A1 |
| 13 | 98.85 | 52.53 | 16.88 | A2 |
| 14 | 98.50 | 51.25 | 17.15 | A3 |
| 15 | 98.64 | 53.60 | 17.01 | A4 |
| 16 | 98.98 | 53.97 | 16.28 | A5 |
| 17 | 98.83 | 51.64 | 16.55 | A6 |
| 19 | 98.95 | 52.00 | 17.20 | A8 |
| 20 | 98.83 | 52.96 | 16.99 | A9 |
| 21 | 98.74 | 53.70 | 16.94 | A10 |
| 22 | 98.96 | 52.41 | 17.26 | A11 |

The examples are blends of 20% precompound A and 80% polypropylene C.

The mechanical data show that the inventive polymer blends are better than reference. The strongest effect both in PE and

TABLE 2

| | PE Precompounds PE | | | | | |
|---|---|---|---|---|---|---|
| | B1 | | | | | |
| | B13-1 | B13-2 | B11 | B2 | A | B3 |
| A12 | — | — | — | — | 400 | — |
| A13 | 85.71 | — | — | — | 400 | — |
| A14 | 71.43 | 71.43 | — | — | 400 | — |
| A15 | 71.43 | — | 71.43 | — | 400 | — |
| A16 | — | 71.43 | 71.43 | — | 400 | — |
| A17 | 71.43 | — | — | 71.43 | 400 | — |
| A18 | — | 71.43 | — | 71.43 | 400 | — |

TABLE 2-continued

| | PE Precompounds PE | | | | | |
|---|---|---|---|---|---|---|
| | B1 | | | | | |
| | B13-1 | B13-2 | B11 | B2 | A | B3 |
| A19 | — | — | 71.43 | 71.43 | 400 | — |
| A20 | 71.43 | — | — | — | 400 | 71.43 |
| A21 | — | 71.43 | — | — | 400 | 71.43 |
| A22 | — | — | 71.43 | — | 400 | 71.43 |
| A23 | — | — | — | 71.43 | 400 | 71.43 |
| A24 | — | — | — | 50 | 400 | 100 | components in parts

TABLE 2-a

PE - Mechanical properties

| Example | Crack propagation resistance DIN ISO 34-1:04-07 Method B, Process (b) with cut | | | | Puncture Resistance | | Precompound |
|---|---|---|---|---|---|---|---|
| | CPR MD N/mm | Fmax N | CPR TD N/mm | Fmax N | Fmax N | W Break Nmm | |
| C2 | 76.8 | 37.1 | 18.5 | 9.2 | 46.6 | 162.9 | A12 |
| 23 | 71 | 35.3 | 22.2 | 10.9 | 45.5 | 174.9 | A13 |
| 24 | 71.3 | 34.9 | 20.2 | 10 | 42.9 | 141.1 | A14 |
| 25 | 73.7 | 35.9 | 25.8 | 12.6 | 47.7 | 204.8 | A15 |
| 26 | 72.5 | 34.5 | 22.2 | 10.7 | 47.3 | 172.3 | A16 |
| 27 | 73.5 | 36 | 22.2 | 11 | 45.7 | 167.8 | A17 |
| 28 | 75.3 | 36.8 | 15.6 | 7.7 | 46.6 | 170 | A18 |
| 29 | 77.4 | 38 | 24.8 | 12.4 | 48.7 | 204.1 | A19 |
| 30 | 80.3 | 39.6 | 21.4 | 10.5 | 46.4 | 170.2 | A20 |
| 31 | 85.2 | 41.7 | 15.8 | 7.7 | 35.5 | 103.1 | A21 |
| 32 | 84.6 | 41.9 | 28 | 13.8 | 48.4 | 179.6 | A22 |
| C3 | 80.3 | 39.8 | 18.8 | 9.3 | 40.8 | 115.9 | A23 |
| C4 | 89.0 | 44.4 | 22.9 | 11.4 | 42.7 | 126.3 | A24 |

The examples are blends of 20% precompound A and 80% polyethylene C

TABLE 2-b

PE - Optical properties

| Example | Haze H % | Transmission Y % | Yellowness YI | Precompound |
|---|---|---|---|---|
| C2 | 94.65 | 59.13 | 16.96 | A12 |
| 23 | 93.21 | 59.56 | 17.34 | A13 |
| 24 | 89.89 | 61.20 | 17.27 | A14 |
| 25 | 80.28 | 61.14 | 18.11 | A15 |
| 26 | 76.03 | 62.36 | 16.86 | A16 |
| 27 | 93.21 | 59.32 | 18.53 | A17 |
| 28 | 90.31 | 59.43 | 17.32 | A18 |
| 29 | 84.37 | 61.36 | 17.42 | A19 |
| 30 | 86.96 | 61.46 | 17.37 | A20 |
| 31 | 83.63 | 61.76 | 16.22 | A21 |
| 32 | 68.60 | 64.43 | 17.36 | A22 |
| C3 | 90.41 | 60.76 | 16.99 | A23 |
| C4 | 87.77 | 61.55 | 15.95 | A24 |

The examples are blends of 20% precompound A and 80% polyethylene C

TABLE 2

PP Precompounds PP

| | B1 | | | | | |
|---|---|---|---|---|---|---|
| | B13-1 | B13-2 | B11 | B2 | A | B3 |
| A25 | — | — | — | — | 400 | — |
| A26 | 85.71 | 57.14 | — | — | 400 | — |
| A27 | — | 71.43 | 71.42 | — | 400 | — |
| A28 | 71.43 | — | — | 71.43 | 400 | — |
| A29 | — | 71.43 | — | 71.43 | 400 | — |
| A30 | 71.43 | — | — | — | 400 | 71.43 |
| A31 | — | — | 71.43 | — | 400 | 71.43 |
| A32 | — | — | — | 71.43 | 400 | 71.43 |
| A33 | — | 57.14 | — | — | 400 | 85.71 |
| A34 | — | — | — | — | 400 | 100 | components in parts

TABLE 2-a

PP - Mechanical properties

| Example | Crack propagation resistance DIN ISO 34-1:04-07 Method B, Process (b) with cut | | | | Puncture Resistance | | Precompound |
|---|---|---|---|---|---|---|---|
| | CPR MD N/mm | Fmax Lm N | CPR TD N/mm | Fmax Lm N | Fmax N | W Break Nmm | |
| C5 | 187.5 | 91.3 | 58.3 | 28.9 | 56.1 | 234.1 | A25 |
| 33 | 260.0 | 125.2 | 61.3 | 30.0 | 61.0 | 301.6 | A26 |
| 34 | 234.9 | 111.5 | 67.5 | 33.0 | 63.9 | 334.4 | A27 |
| 35 | 267.3 | 129.3 | 58.3 | 28.3 | 62.0 | 321.0 | A28 |
| 36 | 262.1 | 126.5 | 58.6 | 28.7 | 62.8 | 311.7 | A29 |
| 37 | 269.1 | 132.0 | 69.2 | 33.5 | 61.4 | 319.8 | A30 |
| 38 | 249.6 | 122.4 | 75.7 | 37.6 | 64.5 | 335.7 | A31 |
| C6 | 263.2 | 124.7 | 62.3 | 30.3 | 63.7 | 333.6 | A32 |
| 39 | 278.6 | 134.1 | 65.9 | 31.5 | 62.4 | 322.4 | A33 |
| C7 | 254.7 | 122.5 | 67.4 | 32.4 | 62.4 | 330.8 | A34 |

TABLE 2-b

| | PP Optical properties | | |
|---|---|---|---|
| Example | Haze H % | Transmission Y % | Yellowness YI |
| C5 | 98.56 | 51.25 | 17.49 |
| 33 | 98.74 | 55.15 | 16.71 |
| 34 | 98.04 | 55.3 | 17.17 |
| 35 | 98.78 | 55.87 | 16.1 |
| 36 | 98.3 | 55.65 | 16.12 |
| 37 | 98.67 | 56.02 | 16.56 |
| 38 | 98.41 | 56.94 | 16.53 |
| C6 | 98.62 | 53.03 | 16.54 |
| 39 | 97.88 | 54.84 | 16.6 |
| C7 | 97.96 | 55.65 | 15.87 |

Table 2-a PE shows that the strongest effects can be achieved by the use of pre-compound A15, A19 and A22 (examples 25, 29 and 32). Table 2-a PP shows that the strongest effects can be achieved by the use of precompound 31 (example 38).

Table 3 shows further compositions of pre-compounds and inventive polymer blends with PE and PP wherein binary and ternary compatibilizer systems have been used. The obtained mechanical data are summarized in Tables 3-a PE and 3a-PP. The polymer blends and films have been prepared according to the standard procedure as described herein-before.

TABLE 3-a

PE - Mechanical properties

| | Precompound | | | | | Puncture Resistance Method B, Process (b) with cut | | | | W Break |
|---|---|---|---|---|---|---|---|---|---|---|
| | | | | | | CPR MD | | CPR TD | | |
| Example | B11 | B2 | A | B3 | PE | N/mm | Fmax N | N/mm | Fmax N | Nmm |
| 40 | 1.962 | 3.066 | 14 | 0.972 | 80 | 66.1 | 41.5 | 55.0 | 34.0 | 163.2 |
| 41 | 1.308 | 2.044 | 16 | 0.648 | 80 | 63.1 | 38.3 | 55.7 | 33.3 | 179.1 |
| 42 | 0.981 | 1.533 | 17 | 0.486 | 80 | 64.1 | 31.8 | 53.6 | 25.2 | 169.7 |
| 43 | 0.981 | 1.533 | 7 | 0.486 | 90 | 64.0 | 37.9 | 60.2 | 29.6 | 163.0 |
| 44 | 0.654 | 1.022 | 8 | 0.324 | 90 | 66.2 | 35.0 | 60.9 | 33.3 | 163.6 |
| 45 | 0.4905 | 0.7665 | 8.5 | 0.243 | 90 | 67.1 | 36.3 | 59.3 | 32.8 | 152.5 |
| 46 | 0.5886 | 0.9198 | 4.2 | 0.2916 | 94 | 65.9 | 36.6 | 62.1 | 31.6 | 157.7 |
| 47 | 0.3924 | 0.6132 | 4.8 | 0.1944 | 94 | 67.5 | 35.6 | 62.1 | 32.9 | 155.9 |
| 48 | 0.2943 | 0.4599 | 5.1 | 0.1458 | 94 | 69.0 | 40.7 | 61.1 | 33.1 | 155.4 |
| 49 | 2.704 | 0 | 16 | 1.296 | 80 | 64.0 | 33.8 | 53.7 | 28.5 | 169.6 |
| 50 | 2.028 | 0 | 7 | 0.972 | 90 | 65.9 | 35.2 | 59.7 | 31.8 | 163.5 |
| 51 | 1.352 | 0 | 8 | 0.648 | 90 | 65.9 | 34.5 | 61.2 | 32.6 | 182.4 |
| 52 | 1.014 | 0 | 8.5 | 0.486 | 90 | 66.9 | 35.2 | 60.1 | 33.7 | 172.3 |
| 53 | 0.8112 | 0 | 4.8 | 0.3888 | 94 | 67.8 | 36.0 | 62.2 | 32.5 | 184.2 | components in % by weight

TABLE 3-a

PP - Mechanical properties

| | Precompound | | | | | Puncture Resistance Method B, Process (b) with cut | | | | W Break |
|---|---|---|---|---|---|---|---|---|---|---|
| | | | | | | CPR MD | | CPR TD | | |
| Example | B11 | B2 | A | B3 | PP | N/mm | Fmax N | N/mm | Fmax N | Nmm |
| 54 | 1.728 | 2.568 | 14 | 1.704 | 80 | 116.4 | 76.6 | 113.8 | 70.2 | 335.5 |
| 55 | 1.152 | 1.712 | 16 | 1.136 | 80 | 78.3 | 61.0 | 113.7 | 65.0 | 335.5 |
| 56 | 0.864 | 1.284 | 17 | 0.852 | 80 | 109.0 | 63.5 | 112.2 | 61.5 | 340.5 |
| 57 | 0.864 | 1.284 | 7 | 0.852 | 90 | 91.1 | 53.5 | 93.0 | 48.3 | 357.1 |
| 58 | 0.576 | 0.856 | 8 | 0.568 | 90 | 102.4 | 66.9 | 96.3 | 68.9 | 357.0 |
| 59 | 0.432 | 0.642 | 8.5 | 0.426 | 90 | 84.9 | 47.7 | 96.8 | 49.0 | 367.1 |
| 60 | 0.5184 | 0.7704 | 4.2 | 0.5112 | 94 | 94.6 | 49.7 | 89.7 | 45.8 | 400.2 |
| 61 | 0.3456 | 0.5136 | 4.8 | 0.3408 | 94 | 96.2 | 53.8 | 85.9 | 48.0 | 388.1 |
| 62 | 0.2592 | 0.3852 | 5.1 | 0.2556 | 94 | 88.0 | 50.1 | 82.8 | 44.9 | 394.8 |
| 63 | 1.468 | 0 | 16 | 2.532 | 80 | 108.3 | 69.7 | 111.0 | 67.3 | 368.9 |
| 64 | 1.101 | 0 | 7 | 1.899 | 90 | 171.2 | 100.9 | 69.9 | 43.0 | 377.8 |
| 65 | 0.734 | 0 | 8 | 1.266 | 90 | 152.2 | 79.6 | 89.5 | 47.5 | 366.3 |
| 66 | 0.5505 | 0 | 8.5 | 0.9495 | 90 | 183.0 | 101.4 | 79.4 | 43.6 | 374.6 |
| 67 | 0.4404 | 0 | 4.8 | 0.7596 | 94 | 161.3 | 88.1 | 95.1 | 54.0 | 386.0 |
| C9 | 0 | 0 | 0 | 0 | 100 | 71.2 | 36.8 | 69.9 | 36.5 | 359.2 | components in %

Table 3-a PE shows that the best results were obtained for inventive polymer PE blends according to examples 46, 47, 48 and 53.

Table 3-a PP shows that the best results were obtained for inventive polymer PP blends according to examples 60, 61, 62 and 67.

In the following examples (tables 4 a-c) films of inventive polyethylene (PE) blends stretched by 500% have been tested.

The blends of this test-series have not been pre-compounded; the pellet mixture was directly fed to the film extruder. The middle zones of the afore-mentioned FTS 16 twin screw extruder have been set to 250° C. in order to homogenize component B11, the other temperatures have been kept on standard level. Homogenous stretched films were obtained. The composition of the blends (% by weight) is shown in table 4

TABLE 4

| | composition of the blends | | | | |
|---|---|---|---|---|---|
| Example | B11 | B2 | A | B3 | PE |
| C10 | 0.00 | 0.00 | 0.00 | 0.00 | 100.00 |
| C25 | 0.00 | 0.00 | 5.33 | 2.00 | 92.67 |
| 69 | 2.00 | 0.00 | 8.00 | 0.00 | 90.00 |
| C11 | 0.00 | 0.00 | 4.00 | 0.00 | 96.00 |
| 70 | 0.67 | 0.67 | 5.33 | 0.67 | 92.67 |
| C12 | 0.00 | 0.00 | 5.33 | 0.00 | 94.67 |
| C13 | 0.00 | 0.00 | 8.00 | 2.00 | 90.00 |
| 71 | 2.00 | 0.00 | 5.33 | 0.00 | 92.67 |

TABLE 4-continued

| | composition of the blends | | | | |
|---|---|---|---|---|---|
| Example | B11 | B2 | A | B3 | PE |
| C14 | 0.00 | 1.33 | 8.00 | 2.00 | 88.67 |
| C15 | 0.00 | 2.00 | 8.00 | 1.33 | 88.67 |
| C16 | 0.00 | 0.00 | 1.33 | 0.33 | 98.33 |
| C17 | 0.00 | 1.67 | 4.00 | 0.00 | 94.33 |
| C18 | 0.00 | 0.00 | 4.00 | 1.67 | 94.33 |
| 72 | 1.33 | 2.00 | 8.00 | 0.00 | 88.67 |
| 73 | 1.33 | 0.00 | 8.00 | 2.00 | 88.67 |
| C19 | 0.00 | 0.00 | 8.00 | 0.00 | 92.00 |
| 74 | 1.00 | 0.67 | 8.00 | 0.67 | 89.67 |
| 75 | 1.67 | 0.00 | 4.00 | 0.00 | 94.33 |
| 76 | 2.00 | 1.33 | 8.00 | 0.00 | 88.67 |
| C20 | 0.00 | 2.00 | 8.00 | 0.00 | 90.00 |
| C21 | 0.00 | 1.00 | 8.00 | 0.00 | 91.00 |
| 77 | 2.00 | 0.00 | 8.00 | 1.33 | 88.67 |
| 78 | 1.00 | 0.00 | 8.00 | 0.00 | 91.00 |
| C22 | 0.00 | 0.00 | 8.00 | 1.00 | 91.00 |
| C23 | 0.00 | 0.33 | 1.33 | 0.00 | 98.33 |
| C24 | 0.00 | 2.00 | 5.33 | 0.00 | 92.67 |
| 79 | 0.53 | 0.53 | 4.27 | 0.53 | 94.13 |
| 80 | 0.47 | 0.47 | 3.73 | 0.47 | 94.87 |
| 81 | 0.40 | 0.40 | 3.20 | 0.40 | 95.60 |
| 82 | 0.33 | 0.33 | 2.67 | 0.33 | 96.33 |

Besides standard mechanical and optical testing (table 4a), a tensile test (table 4b) and a dart drop test (table 4c) were performed.

The dart drop test indicates the film stability under fast impact conditions as opposed to the slow tear and puncture resistance as well as tensile tests.

TABLE 4-a

| | PE - Mechanical properties and transparency of 40 μm film | | | | | | |
|---|---|---|---|---|---|---|---|
| | Crack propagation resistance DIN ISO 34-1:04-07 Method B, Process (b) with cut | | | | Puncture Resistance | | |
| Example | CPR MD N/mm | Fmax N | CPR TD N/mm | Fmax N | Fmax N | W Break Nmm | Optics Transmisson % |
| C10 | 76.8 | 3.5 | 45.5 | 2.1 | 4.60 | 20.71 | 89.04 |
| C25 | 78.7 | 3.95 | 36.1 | 1.7 | 5.18 | 29.09 | 87.27 |
| 69 | 64.7 | 6.72 | 52.5 | 4.95 | 7.76 | 45.28 | 84.32 |
| C11 | 76.8 | 4 | 37.4 | 2.06 | 5.27 | 27.80 | 88.48 |
| 70 | 69.7 | 3.35 | 50.3 | 2.26 | 4.68 | 25.07 | 88.07 |
| C12 | 80.7 | 3.82 | 39.9 | 1.78 | 4.90 | 26.27 | 88.41 |
| C13 | 80.6 | 4.11 | 36.7 | 1.66 | 5.55 | 31.30 | 86.11 |
| 71 | 75.9 | 4.04 | 53.3 | 2.37 | 4.98 | 27.02 | 87.91 |
| C14 | 83.1 | 4.1 | 36.0 | 1.67 | 5.58 | 29.27 | 85.43 |
| C15 | 84.2 | 4.2 | 32.2 | 1.45 | 4.88 | 26.39 | 85.52 |
| C16 | 82.6 | 4.05 | 40.1 | 1.94 | 5.05 | 24.79 | 88.89 |
| C17 | 84.4 | 3.65 | 38.6 | 1.66 | 4.90 | 26.00 | 87.74 |
| C18 | 79.9 | 4.13 | 40.0 | 1.9 | 5.45 | 29.20 | 88.29 |
| 72 | 72.0 | 3.4 | 48.0 | 2.14 | 4.73 | 25.93 | 84.54 |
| 73 | 78.6 | 3.58 | 49.3 | 2.17 | 5.07 | 29.31 | 85.70 |
| C19 | 80.4 | 3.68 | 36.6 | 1.69 | 5.01 | 26.96 | 85.61 |
| 74 | 75.4 | 3.37 | 47.5 | 2.1 | 4.80 | 26.75 | 84.87 |
| 75 | 70.0 | 3.86 | 48.8 | 2.4 | 4.91 | 27.61 | 87.78 |
| 76 | 65.4 | 3.27 | 41.7 | 1.8 | 3.87 | 18.80 | 84.01 |
| C20 | 76.9 | 3.82 | 32.8 | 1.5 | 4.84 | 23.80 | 84.89 |
| C21 | 79.9 | 3.61 | 35.1 | 1.6 | 4.97 | 23.81 | 85.61 |
| 77 | 70.9 | 3.41 | 49.8 | 2.41 | 3.94 | 19.89 | 83.94 |
| 78 | 66.9 | 3.32 | 45.5 | 2.08 | 3.09 | 12.37 | 86.80 |
| C22 | 83.1 | 3.7 | 35.1 | 1.65 | 5.55 | 30.20 | 86.08 |
| C23 | 72.5 | 3.63 | 37.2 | 1.85 | 4.96 | 24.28 | 89.00 |
| C24 | 81.6 | 3.84 | 36.0 | 1.66 | 5.37 | 27.68 | 86.77 |
| 79 | 73.9 | 3.86 | 49.3 | 2.26 | 3.70 | 17.47 | 88.06 |
| 80 | 78.8 | 3.85 | 54.7 | 2.67 | 3.56 | 17.61 | 88.53 |
| 81 | 74.1 | 3.66 | 49.1 | 2.3 | 4.05 | 19.29 | 88.48 |
| 82 | 79.6 | 3.71 | 52.4 | 2.47 | 4.44 | 22.54 | 88.48 |

Table 4-a PE shows the best results for examples 69, 70, 71, 72, 73, 75, 77 and 82.

TABLE 4-b

PE - tensile testing of 40 μm film

| | machine direction | | transversal direction | |
|---|---|---|---|---|
| Example | σ-B [N] | ε-B [%] | σ-B [N] | ε-B [%] |
| C10 | 78.32 | 532.07 | 48.99 | 831.97 |
| C25 | 81.47 | 648.50 | 44.37 | 784.73 |
| 69 | 48.51 | 797.72 | 33.61 | 643.80 |
| C11 | 78.10 | 595.85 | 47.13 | 766.82 |
| 70 | 70.09 | 631.48 | | |
| C12 | 78.40 | 579.74 | 43.45 | 725.20 |
| C13 | 90.61 | 695.80 | 40.05 | 661.90 |
| 71 | 65.45 | 614.16 | 53.49 | 848.85 |
| C14 | 88.91 | 685.08 | 38.49 | 529.87 |
| C15 | 74.47 | 550.12 | 32.88 | 386.03 |
| C16 | 81.17 | 568.89 | 49.19 | 804.02 |
| C17 | 80.28 | 616.00 | 44.90 | 645.75 |
| C18 | 83.44 | 617.05 | 36.07 | 521.50 |
| 72 | 64.55 | 635.05 | 42.01 | 617.13 |
| 73 | 68.09 | 604.58 | 44.92 | 535.93 |
| C19 | 84.03 | 632.89 | 42.85 | 651.58 |
| 74 | 65.39 | 591.81 | 52.19 | 823.87 |
| 75 | 73.62 | 572.74 | 37.77 | 528.98 |
| 76 | 67.06 | 645.74 | 44.55 | 670.44 |
| C20 | 85.20 | 663.40 | 36.54 | 507.05 |
| C21 | 81.59 | 600.41 | 41.87 | 644.15 |
| 77 | 70.34 | 653.52 | 37.72 | 531.89 |
| 78 | 67.82 | 623.23 | 40.07 | 601.89 |
| C22 | 85.01 | 644.39 | 41.65 | 689.36 |
| C23 | 78.13 | 575.47 | 45.99 | 715.70 |
| C24 | 76.55 | 568.41 | 43.72 | 687.21 |
| 79 | 68.21 | 607.86 | 44.31 | 649.42 |
| 80 | 70.59 | 629.97 | 48.07 | 710.44 |
| 81 | 74.15 | 627.91 | 40.68 | 672.63 |
| 82 | 62.29 | 535.81 | 43.74 | 675.76 |

Table 4-b PE shows the best results for examples 69, 70, 71, 72, 73, 75, 77 and 82.

TABLE 4-c

PE - dart drop test on 40 μm film

DIN 53 373

| Example | Force F [N] | Energy E [J] | Strain s [mm] |
|---|---|---|---|
| C10 | 20.66 | 0.072 | 6.116 |
| C25 | 23.286 | 0.118 | 2.564 |
| 69 | 32.746 | 0.132 | 7.32 |
| C11 | 20.996 | 0.104 | 7.356 |
| 70 | 20.754 | 0.082 | 6.52 |
| C12 | 23.772 | 0.118 | 8.186 |
| C13 | 24.292 | 0.134 | 8.86 |
| 71 | 21.362 | 0.09 | 6.856 |
| C14 | 22.704 | 0.104 | 7.63 |
| C15 | 23.164 | 0.126 | 8.37 |
| C16 | 25.452 | 0.124 | 8.304 |
| C17 | 23.986 | 0.118 | 8.004 |
| C18 | 22.674 | 0.102 | 7.598 |
| 72 | 19.136 | 0.074 | 6.22 |
| 73 | 19.47 | 0.09 | 6.998 |
| C19 | 23.136 | 0.096 | 7.262 |
| 74 | 20.448 | 0.08 | 6.432 |
| 75 | 20.008 | 0.238 | 15.744 |
| 76 | 16.54 | 0.214 | 15.388 |
| C20 | 28.168 | 0.192 | 10.518 |
| C21 | 26.368 | 0.148 | 9.05 |
| 77 | 17.182 | 0.12 | 8.49 |
| 78 | 16.51 | 0.068 | 4.604 |
| C22 | 26.856 | 0.144 | 8.91 |
| C23 | 25.484 | 0.134 | 8.428 |
| C24 | 25.634 | 0.134 | 8.462 |
| 79 | 18.988 | 0.224 | 14.458 |
| 80 | 18.342 | 0.238 | 15.392 |
| 81 | 17.764 | 0.184 | 15.392 |
| 82 | 18.006 | 0.158 | 9.268 |

Table 4-c PE shows the best results for examples 69, 75 and 82.

Furthermore tables 4a-c show that ductility and impact properties are not going parallel for micromechanic reasons connected with the particle size of component A. The inventive polymer blends have the advantage that their properties can be adjusted to the customer's needs in putting more emphasis either on crack propagation or impact properties, e.g. by reducing the compatibilizer content in respect to the amount of component A.

The examples show that the polymer blends of the present invention and films produced therefrom have an improved crack propagation resistance, puncture resistance and dart impact properties. Beside said mechanical properties, the optical properties are also good.

The invention claimed is:
1. Polymer blend comprising components A, B and C:
A: 1 to 19.5% by weight of an elastomeric block copolymer A made from at least one block S which forms a hard phase and incorporates units of a vinylaromatic monomer, and at least one elastomeric block B/S which forms a soft phase and incorporates both units of a vinylaromatic monomer (S) and of a diene (B), where S is the vinylaromatic block and B/S is the soft phase, wherein the block is built up randomly from diene units and vinylaromatic units, and where the glass transition temperature Tg of the block S is above 25° C., and that of the block B/S is below 25° C., and the phase volume ratio of block S to block B/S is selected so that the proportion of hard phase in the entire block copolymer is from 1 to 40% by volume and the proportion of the diene is less than 50% by weight, based on A;
B: 0.5 to 8% by weight of component B comprising components B1 and further optional components B2 and/or B3:
B1: at least one elastomeric block copolymer selected from the group consisting of B11, B12 and B13:
B11: block copolymer B11 made from at least one block S which forms a hard phase and incorporates units of a vinylaromatic monomer, and at least one elastomeric block EB which forms a soft phase and incorporates units of ethylene and butylene; and/or
B12: block copolymer B12 made from at least one block S which forms a hard phase and incorporates units of a vinylaromatic monomer, and at least one elastomeric block EP which forms a soft phase and incorporates units of ethylene and propylene; and/or
B13: block copolymer B13 made from at least one block S which forms a hard phase and incorporates units of a vinylaromatic monomer, and at least one elastomeric block B which forms a soft phase and incorporates units of a diene (B), and the proportion of the hard phase in the entire block copolymer is at most 45% by weight, based on B13;

B2: a stiff/tough block copolymer B2 made from at least one block S which forms a hard phase and incorporates units of a vinylaromatic monomer, and at least one elastomeric block B which forms a soft phase and incorporates units of a diene (B), and the proportion of the hard phase in the entire block copolymer is more than 50% by weight, based on B2;

B3: an ethylene-$(C_3-C_{18})$-α-olefin copolymer B3 with a content of 10 to 30 weight % of $(C_3-C_{18})$-α-olefin, based on B3, and having a crystallinity of less than 50%;

C: 80 to 98.5% by weight of at least one semi-crystalline olefin homo- or copolymer C selected from the group consisting of high-density polyethylene (HDPE), a low-density polyethylene (LDPE), a linear low-density polyethylene (LLDPE) or a propylene homo- or copolymer (PP), different from component B3;

where the polymer blend components A, B and C add up to 100 weight %, based on the entire weight of components A, B and C.

2. A polymer blend according to claim 1, wherein component A is a block copolymer having one of the general formulae S-(B/S)-S, X-[-(B/S)-S]$_2$, Y-[-(B/S)-S]$_2$ Y[(B/S-S)$_n$l$_m$[S]$_l$ and Y[(S-B/S)$_n$-S]$_m$[S]$_l$, where S is the vinylaromatic block and B/S is the soft phase, X is the radical of an n-functional initiator, Y is the radical of an m-functional or (m+l)-functional coupling agent, and l, m and n are natural numbers from 1 to 10.

3. A polymer blend according to claim 1, wherein component A is a linear styrene-butadiene block copolymer of the general structure S-(S/B)-S having, situated between the two S blocks, one or more (S/B)-random blocks having random styrene/butadiene distribution, and a 1,2-vinyl content in the styrene-butadiene copolymer block (S/B) of below 20%.

4. A polymer blend according to claim 1, comprising combinations of components A, B1, C and optionally B2 and/or B3 selected from the group consisting of: A, B1 and C; A, B1, B2 and C; A, B1, B3 and C; and A, B1, B2, B3 and C.

5. A polymer blend according to claim 1, wherein, based on the entire component B, the amount of component B1 is 1 to 100% by weight; the amount of component B2 is 0 to 99% by weight; and the amount of component B3 is 0 to 99% by weight, where the entire amounts of components B1, B2 and B3 together give exactly 100% by weight.

6. A polymer blend according to claim 1, wherein component B1 is B11 and/or B13; C is polyethylene and/or polypropylene, B3, if present, is an ethylene-octene copolymer, and B2, if present, is a SBS block copolymer.

7. A polymer blend according to claim 1, having the following composition:
1 to 10% by weight of component A,
0.8 to 2.5% by weight of component B11, B13, or a combination of B11 and B13, and
87.5 to 98.2% by weight of component C.

8. A polymer blend according to claim 1, having the following composition:
1 to 10% by weight of component A,
0.1 to 0.8% by weight of component B11, B13, or a combination of B11 and B13,
0.1 to 0.8% by weight of component B2,
0.1 to 0.8% by weight of component B3, and
87.6 to 98.7% by weight of component C.

9. A polymer blend according to claim 1, having the following composition:
1 to 10% by weight of component A,
0.8 to 2.5% by weight of component B11, B13, or a combination of B11 and B13,
0.8 to 2.5% by weight of component B2, and
85 to 94% by weight of component C.

10. A polymer blend according to claim 1, having the following composition:
1 to 10% by weight of component A,
0.8 to 2.5% by weight of component B11, B13, or a combination of B11 and B13,
0.8 to 2.5% by weight of component B3, and
85 to 94% by weight of component C.

11. A polymer blend according to claim 1, having the following composition:
10 to 17% by weight of component A,
1.0 to 6.0% by weight of component B11, B13, or a combination of B11 and B13, and
80 to 87% by weight of component C.

12. A polymer blend according to claim 1, having the following composition:
1 to 10% by weight of component A,
0.2 to 0.8% by weight of component B11, B13, or a combination of B11 and B13,
0.2 to 1.0% by weight of component B2,
0.1 to 0.8% by weight of component B3, and
87.4 to 98.5% by weight of component C.

13. A polymer blend according to claim 1, having the following composition:
10 to 17% by weight of component A,
0.8 to 3.0% by weight of component B11, B13, or a combination of B11 and B13,
0.8 to 3.0% by weight of component B2, and
80 to 87% by weight of component C.

14. A polymer blend according to claim 1, having the following composition:
10 to 17% by weight of component A,
0.8 to 3.0% by weight of component B11, B13, or a combination of B11 and B13,
0.8 to 3.0% by weight of component B3, and
80 to 87% by weight of component C.

15. A process for the preparation of a polymer blend according to claim 1, wherein:
a pre-compound of components A and B1 and, if present, components B2 and B3 is prepared in an extruder;
the prepared pre-compound is pre-mixed with a polyolefin component C, and then this mixture is extruded to give the polymer blend.

16. A master batch comprising a pre-compound of, 50 to 60% by weight of component A, 10 to 20% by weight of component B1, 5 to 15% by weight of component B2 and 15 to 30% by weight of component B3, where the polymer blend components A, and B add up to 100 weight %, based on the entire weight of components A and B, and
wherein:
A: 1 to 19.5% by weight of an elastomeric block copolymer A made from at least one block S which forms a hard phase and incorporates units of a vinylaromatic monomer, and at least one elastomeric block B/S which forms a soft phase and incorporates both units of a vinylaromatic monomer (S) and of a diene (B), where S is the vinylaromatic block and B/S is the soft phase, wherein the block is built up randomly from diene units and vinylaromatic units, and where the glass transition temperature Tg of the block S is above 25° C., and that of the block B/S is below 25° C., and the phase volume ratio of block S to block B/S is selected so that the proportion of hard phase in the entire block copolymer is from 1 to 40% by volume and the proportion of the diene is less than 50% by weight, based on A;

B1: at least one elastomeric block copolymer selected from the group consisting of B11, B12 and B13:

B11: block copolymer B11 made from at least one block S which forms a hard phase and incorporates units of a vinylaromatic monomer, and at least one elastomeric block EB which forms a soft phase and incorporates units of ethylene and butylene; and/or B12: block copolymer B12 made from at least one block S which forms a hard phase and incorporates units of a vinylaromatic monomer, and at least one elastomeric block EP which forms a soft phase and incorporates units of ethylene and propylene; and/or B13: block copolymer B13 made from at least one block S which forms a hard phase and incorporates units of a vinylaromatic monomer, and at least one elastomeric block B which forms a soft phase and incorporates units of a diene (B), and the proportion of the hard phase in the entire block copolymer is at most 45% by weight, based on B13;

B2: a stiff/tough block copolymer B2 made from at least one block S which forms a hard phase and incorporates units of a vinylaromatic monomer, and at least one elastomeric block B which forms a soft phase and incorporates units of a diene (B), and the proportion of the hard phase in the entire block copolymer is more than 50% by weight, based on B2;

B3: an ethylene-($C_3$-$C_{13}$)-α-olefin copolymer B3 with a high content of 10 to 30 weight % of ($C_3$-$C_{18}$-α-olefin, based on B3, and having a crystallinity of less than 50%.

17. A single-, bi- or multi-layer-film comprising a polymer blend according to claim 1.

18. A food packaging or shrink hood comprising a film according to claim 17.

* * * * *